Sept. 17, 1957  J. B. VAN DER WINDEN  2,806,423
APPARATUS FOR STERILIZING AND PASTEURIZING
GOODS IN CONTAINERS
Filed Feb. 16, 1955

United States Patent Office 2,806,423
Patented Sept. 17, 1957

2,806,423

APPARATUS FOR STERILIZING AND PASTEURIZING GOODS IN CONTAINERS

Johannes B. van der Winden, Nieuwer Amstel, Netherlands, assignor to Gebr. Stork & Co's Apparatenfabriek N. V., Amsterdam, Netherlands, a company of the Netherlands Application February 16, 1955, Serial No. 488,696

Claims priority, application Netherlands February 17, 1954

3 Claims. (Cl. 99—362)

The invention relates to apparatus for continuously sterilizing (or pasteurizing) goods packed in containers, of the type comprising an over-pressure steam chamber which is in open communication with the short limbs of two open U-shaped liquid seals, through which system moves an endless conveyor part of which moves outside the system, said conveyor being provided with carriers for the containers. Apparatus of this type is known.

The invention relates in particular to a sterilizing apparatus of the type referred to, comprising three towers, which communicate with one another at the bottom and thus form a space in the way of two U-shaped tubes disposed side by side; both U-shaped spaces are separated at the bottom by a partition rising upwards for some distance into the central tower. The central tower constitutes the sterilizing chamber, into which steam is introduced. The two other towers, which communicate with one another at the top of the said partition, are filled with water.

With a view to cooling the containers that have been heated in the steam chamber the outgoing limb of the system of U-tubes is continuously supplied with cooling water, which, after heat exchange with the containers, rises in the incoming limb of the system and there serves for the preheating of the containers.

In this connection the drawback presents itself that the cold cooling water introduced immediately sinks down, with unsufficient heat exchange with the containers, so that at the interface between steam and water, in the lower part of the central tower, a temperature is set up which causes intensive condensation of the steam and consequently reduces the efficiency of the apparatus. Moreover the containers leaving the apparatus have not been cooled down sufficiently.

This drawback is obviated according to the invention because on the conveyor, between the carriers or groups of carriers, have been fitted partitions disposed at right angles to the direction of movement, which partitions, while leaving limited passages formed e. g. exclusively by the clearance between the walls of the towers and the edges of said partitions, substantially fill the profile of the channel.

Thus, upon the conveyor circulating through the cooling space, the latter is as it were subdivided into partial cooling zones which contain at least one carrier with containers and in which intensive heat exchange takes place, the heated cooling water entering through the said limited passages into the next, also partial cooling zone below, absorbs heat there, and so on. In the whole of the cooling chamber a substantially rectilinear heat gradient is thus set up, resulting in better cooling of the containers and a higher temperature of the water near the interface, and consequently less condensation of steam.

The invention will be elucidated more fully below with reference to the drawings.

Fig. 1 illustrates diagrammatically a vertical longitudinal section of a sterilizing apparatus to which the invention has been applied.

Fig. 2 is a detail drawing on a somewhat enlarged scale of a number of links of one of the conveyor chains, viewed from the inside.

The sterilizing apparatus shown in Fig. 1 mainly comprises three towers 1, 2, 3. These towers communicate at the bottom, so that they form a continuous space in the way of two U-shaped tubes disposed side by side. To this end the lower part of the central tower 2 is also divided in two by a partition 4.

The tower 2 is the sterilizing chamber proper, into which steam is admitted. Both the tower 1 and the tower 2 contain water. The difference $h$ between the water level in the towers 1 and 3 respectively and the level of the water in the central tower 2 is caused by the steam pressure in the central tower 2. This difference in level $h$ inversely also determines the steam pressure.

An endless conveyor 5 moves in the direction of the arrow 6, entering the tower 1 at the top, moving through the entire height of the tower 1 from top to bottom; at the bottom, freely hanging in a loop or guided on pulleys it reverses its direction by 180°, and then rises in the tower 2 into the steam chamber. At the top of the tower 2 the conveyor passes along a pulley 7, upon which the direction of the conveyor is again reversed by 180°. The conveyor then moves on in the tower 2, again reaches the water at the bottom, again reverses its direction by 180°, either by being guided along pulleys or because the conveyor hangs freely in a loop. The conveyor subsequently rises through the water in the tower 3, then passes along the pulley 8, and via pulley 9 returns to the route described above.

The conveyor 5 comprises at least two parallel chains, fitted along their entire length with carriers 10, only a few of which are illustrated in Fig. 1. These carriers 10 have a cylindrical shape and at their axes are freely rotatable about shafts 11, which have been fitted between the conveyor chains. In this case the carriers 10 consist, for example, of circular bundles of tubes 12, into which the containers to be treated are pushed.

When the conveyor circulates, the containers are preheated in the water of the tower 1, sterilized in the steam of the tower 2, cooled down in the water of the tower 3. The conveyor operates continuously, and it is precisely in this respect that the system can be looked upon as perfectly "open."

After having passed along the pulley 8, the carriers can be unloaded, i. e. the containers to be sterilized are taken out. The unloading station is indicated diagrammatically by 13. Beside it is the loading station 14, likewise shown diagrammatically.

In parallel with the conveyor chains 5 a chain 15 passes through the apparatus. In mesh with this are sprockets 16 on each carrier 10. This chain 15 is run with a small difference in speed as compared with the conveyor chains 5, with the result that the carriers 10 are continuously, though slowly, revolved.

In the upper horizontal section between the pulleys 17 and 18 the driving chain 15 is so far removed from the conveyor chain 5 that the chain 15 no longer engages the sprockets 16. The result is that near the loading and unloading stations 14, 13 the carriers 10 are freely rotatable and can therefore be freely manipulated for loading and unloading.

So far this sterilizing apparatus is of a known type. According to the invention small flat partitions 19 have been fitted, between every two carriers 10 or between every two groups of carriers 10, on the conveyor and in particular between the two chains 5 thereof, said partitions being disposed at right angles to the direction of movement of the conveyor and having such dimensions that they leave limited passages along the walls of the channels with rectangular profile formed by the towers 1 and 3, and consequently substantially fill this profile. The effect aimed at with these partitions has been described in the preamble of the specification, and does not therefore call for any further elucidation. The partitions may simply be welded between the chains, to the links thereof. It will be obvious that, though for simplicity's sake carriers 10 with interposed partitions 19 are illustrated in the drawing only near the exit of the tower 3, the conveyor is provided in this way with carriers and partitions all along.

I claim:

1. A device for sterilizing items comprising a water chamber having closed sidewalls and a substantially constant cross-section between said sidewalls, a steam chamber connected at the lower side to said water chamber, a conveyor movable through said water and steam chambers, supports on said conveyor for supporting said items, said supports being constituted by open work structures so as to admit the fluid contained in the said water and steam chamber freely to said items, spaced partitions being mounted on and movable with said conveyor, and positioned intermediate adjacent of said supports, partitions extending transversely to the direction of movement of said conveyor and occupying substantially the entire cross-section of said water chamber to minimize the flow of water in said chamber in the direction of the conveyor.

2. Apparatus for sterilizing and pasteurizing goods in containers comprising two upright water chambers open at their top, a closed overpressure steam chamber connected to the bottoms of said water chambers, said water chambers constituting two U-shaped seals for said steam chambers, an endless conveyor movable through said water and steam chambers, supports on said conveyor for supporting said containers, said supports being constituted by open work structures so as to give the fluid contained in the said water and steam chambers free access to said containers, spaced partitions being mounted on and movable with said conveyor and positioned intermediate adjacent of said supports, said partitions extending transversely to the direction of movement of said conveyor, at least one of said water chambers having a constant cross-sectional area transverse to the direction of said conveyor, the said partitions occupying substantially the entire cross-section of the said water chamber of constant cross-sectional area and defining limited passages for the water along the edges of said partitions.

3. Apparatus as claimed in claim 2 wherein said partitions are planar elements, said supports being cylindrical elements of equal diameter and having their axes parallel to the planar elements, said partitions being spaced substantially by the diameter of said cylindrical elements.

References Cited in the file of this patent
UNITED STATES PATENTS

| | | |
|---|---|---|
| 1,419,139 | Hunter | June 13, 1922 |
| 2,556,385 | Allan | June 12, 1951 |
| 2,695,555 | Carvollo | Nov. 30, 1954 |